United States Patent
Weingarten et al.

[11] Patent Number: 5,987,049
[45] Date of Patent: Nov. 16, 1999

[54] MODE LOCKED SOLID-STATE LASER PUMPED BY A NON-DIFFRACTION-LIMITED PUMPING SOURCE AND METHOD FOR GENERATING PULSED LASER RADIATION BY PUMPING WITH A NON-DIFFRACTION-LIMITED PUMPING BEAM

[75] Inventors: Kurt Weingarten; Wolfgang Schüsslbauer, both of Zurich, Switzerland

[73] Assignee: Time-Bandwidth Products AG, Zurich, Switzerland

[21] Appl. No.: 09/066,509

[22] Filed: Apr. 24, 1998

[51] Int. Cl.⁶ .................................................. H01S 3/091
[52] U.S. Cl. ................ 372/70; 372/98; 372/18; 372/11
[58] Field of Search .................. 372/70, 98, 18, 372/11, 99, 92

[56] References Cited

U.S. PATENT DOCUMENTS

| | | |
|---|---|---|
| 5,237,577 | 8/1993 | Keller et al. .............................. 372/11 |
| 5,345,454 | 9/1994 | Keller ........................................ 372/18 |
| 5,524,011 | 6/1996 | Lawandy ................................... 372/22 |
| 5,701,327 | 12/1997 | Cunningham et al. ................... 372/18 |

*Primary Examiner*—Leon Scott, Jr.
*Attorney, Agent, or Firm*—Walter C. Farley

[57] ABSTRACT

A pulsed solid-state laser comprises an optical resonator and a solid-state laser medium placed inside the optical resonator. A saturable absorber, such as a semiconductor saturable absorber mirror device for passive mode locking is placed inside the optical resonator, and a pumping source is provided for exciting the laser gain medium to emit electromagnetic radiation. The pumping source emits pump radiation which impinges on the laser gain medium in the form of a non-diffraction-limited focused pumping beam. The product of the stimulated emission cross section times the spontaneous fluorescence lifetime is low for the laser medium, e.g., $0.1 \cdot 10^{-23}$ cm²s for Ti:sapphire; nevertheless, the laser yields a high output power of a few Watt even if pumped with a non-diffraction-limited pumping beam. Pumping with a non-diffraction-limited pumping beam makes feasible solid-state lasers with remarkably smaller sizes and lower costs, but with the same performance as known lasers.

15 Claims, 6 Drawing Sheets

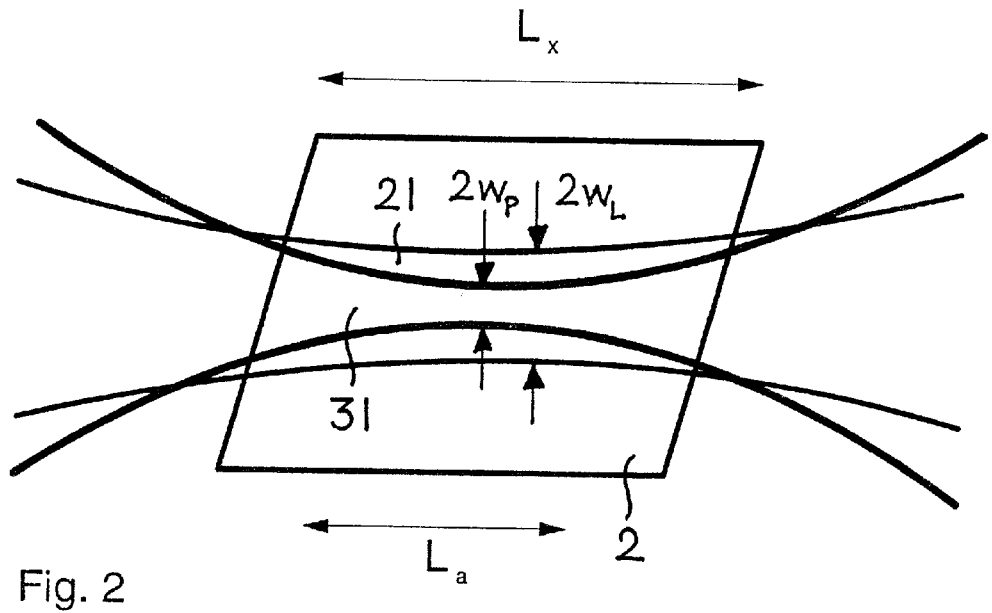
Fig. 2
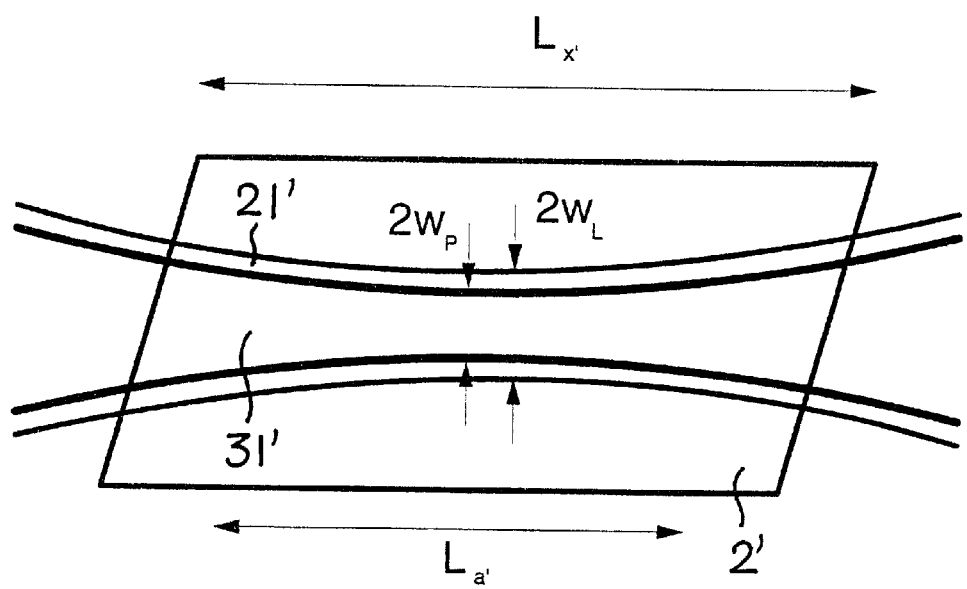
Fig. 3    STATE OF THE ART

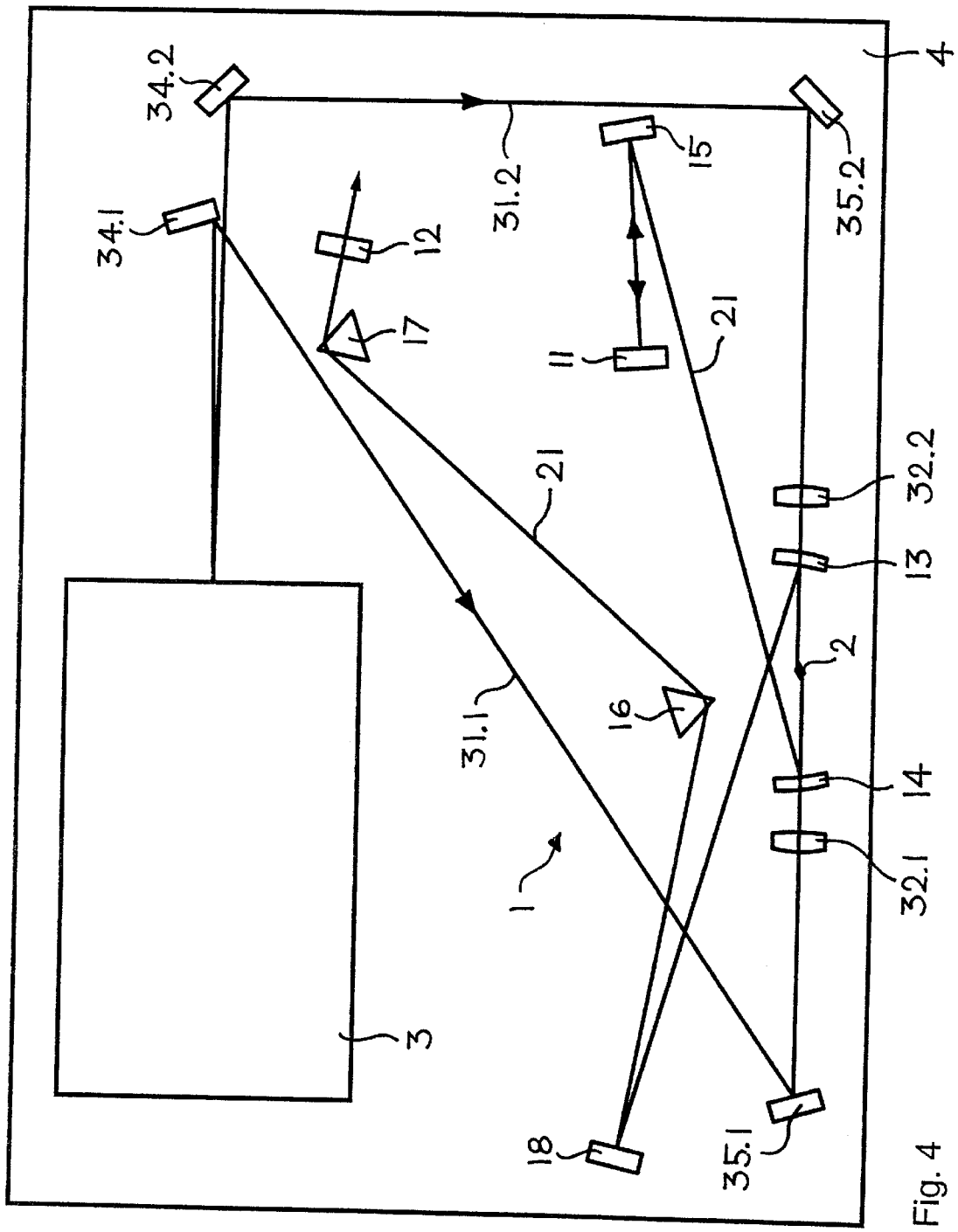

MODE LOCKED SOLID-STATE LASER PUMPED BY A NON-DIFFRACTION-LIMITED PUMPING SOURCE AND METHOD FOR GENERATING PULSED LASER RADIATION BY PUMPING WITH A NON-DIFFRACTION-LIMITED PUMPING BEAM

FIELD OF THE INVENTION

This invention relates to lasers and, more particularly, to mode locked solid-state lasers pumped by non-diffraction-limited pumping sources and to methods for generating pulsed laser radiation by pumping with non-diffraction-limited pumping beams.

BACKGROUND OF THE INVENTION

Solid-state lasers are known in the art. Their laser gain media are dopant ions incorporated in dilute concentrations in solid hosts. The laser gain medium can be optically excited to emit electromagnetic radiation by impinging a pumping beam on the laser gain medium. In order to achieve the highest possible pumping efficiency or, equivalently, the highest possible small-signal gain, the intensity of the pumping beam must be high over a large distance in the laser gain medium. This can be achieved by using a focused diffraction-limited pumping beam, e.g., a fundamental $TEM_{00}$ mode of a pumping laser. However, lasers emitting diffraction-limited beams are expensive and take up a large space. Because of these disadvantages, it is desirable to use non-diffraction-limited pumping beams originating from other pumping sources.

For efficient optical pumping, the overlap of the pumping beam with the laser mode must generally be high over the absorption length in the laser gain medium. For this purpose, it is known to set the confocal parameter of the pumping beam approximately equal to the absorption length of the laser gain medium, which is called mode matching. However, the filling of this mode matching condition brings in the following disadvantages. The pumping-beam waist must be above a certain lower limit, to which the laser-mode waist must be matched. If the pumping-beam waist is too small, higher-order spatial modes are excited in the laser resonator, and if it is too large, the small-signal gain decreases, the laser threshold increases, and the laser is either not very efficient or does not even reach threshold. As the pumping-beam waist and the laser-mode waist are increased, the small-signal gain decreases, and the laser threshold also increases; this renders difficult or even impossible the construction of an efficient laser with high output power from a low-power pumping laser. As is shown below, these difficulties have even more serious consequences for the construction of a pulsed mode locked laser.

Lasers emitting short or ultrashort pulses are important tools in a wide variety of applications in physics, chemistry, biology and medicine. A well-known technique for short or ultrashort pulse generation is mode locking. Mode locking is a coherent superposition of longitudinal laser cavity modes. It is forced by a temporal loss modulation which reduces the intracavity losses for a pulse within each cavity-roundtrip time. This results in an open net gain window, in which pulses only experience gain if they pass the modulator every cavity roundtrip time. The loss modulation can be formed either actively or passively. Active mode locking is achieved, for instance, using an acousto-optic modulator as an intracavity element, which is synchronized to the cavity-round trip time. However, short-pulse generation (in the femtosecond range) relies on passive mode locking techniques, because only a passive shutter is fast enough to shape and stabilize ultrashort pulses.

Ultra-fast passively mode locked solid-state lasers such as Ti:sapphire lasers typically use Kerr-lens mode locking. In Kerr-lens mode locking, self-focusing of the laser beam due to the Kerr effect combined with either a hard aperture or a "soft" gain aperture produces a self amplitude modulation. Kerr-lens mode locking has two main disadvantages. First, in order to achieve strong self-focusing, high pulse powers within the resonator are required. For this purpose, pumping lasers with high output powers of typically more than 3 W at wavelengths of about 500 nm have to be used. Second, a high overlap of the resonator mode and the pumping beam over a large distance, i.e., good mode matching, is required. As described above, fulfilling the mode matching condition for non-diffraction-limited pumping beams causes problems for continuous-wave lasers. For Kerr-lens-mode locked lasers, these problems are even more serious. Additionally, if the pumping-beam waist is increased, the intra-cavity intensity decreases due to decrease of the small-signal gain and because the laser-mode waist is larger. Therefore, the nonlinear Kerr effect is strongly reduced, which makes Kerr-lens mode locking very difficult. Moreover, nonlinear aperturing in the laser gain material also decreases due to the larger laser-mode waist, further weakening the Kerr-lens mode locking.

The mode matching requirement is critical especially for mode locked Ti:sapphire lasers because of the relatively small gain in the Ti:sapphire crystal. For a high overlap, a high pumping-beam quality, a high pumping-beam stability, a precise resonator adjustment and a high resonator stability are necessary. Consequently, Kerr-lens mode locked lasers must be pumped with a pumping laser emitting its fundamental $TEM_{00}$ mode and being diffraction-limited, i.e., having a coefficient of beam quality $M^2 \sim 1$. They are relatively expensive and scarecely suitable for non-laboratory applications.

Passive mode locking can also be achieved with semiconductor saturable absorber mirrors. A semiconductor saturable absorber mirror is a nonlinear mirror inserted inside the laser cavity. Its reflectivity is higher at higher light intensities due to absorption bleaching obtained by using semiconductors as the nonlinear material. A semiconductor saturable absorber mirror typically consists of a bottom mirror, the saturable absorber structure and, optionally, an additional antireflection or high-reflection coating on the top.

In this document, the following physical concepts are used.

1. The coefficient of beam quality $M^2$ (cf. T. F. Johnston, Jr., "$M^2$ concept characterizes beam quality", Laser Focus World, May 1990) of a light beam propagating in a medium is defined as $$M^2 = (\pi n/4) \cdot \theta \cdot (2w_0)/\lambda,$$

wherein n is the refraction index of the medium, $\theta$ is the beam divergence angle, $2w_0$ is the waist diameter and $\lambda$ is the vacuum wavelength of the beam. $M^2 = 1$ for a diffraction-limited fundamental laser mode, and it increases for modes of greater divergence or greater focal area.

2. The confocal parameter of a light beam is defined as $$b = (\pi n/2) \cdot (2w_0)^2/(M^2\lambda) = 4w_0/\theta.$$

3. The absorption length $L_a$ of a medium for light of a given wavelength is defined as $$L_a = 1/\alpha,$$

wherein $\alpha$ is the absorption coefficient of the medium and is defined by the equation $$I(x) = I(0) \cdot e^{-\alpha x},$$

$I(0)$ being the incoming light intensity and $I(x)$ being the light intensity after a penetration depth x.

4. The product $\sigma\tau$ of the stimulated emission cross section a and the spontaneous fluorescence lifetime $\tau$ is characteristic for a certain material at a given wave-length. A laser-gain medium with a large product $\sigma\tau$ yields high figures of merit.

SUMMARY OF THE INVENTION

According to the invention, a passively mode locked solid-state laser with a laser gain medium with low $\sigma\tau$ can be pumped with a non-diffraction-limited pumping source and still yield a high output power. Pumping lasers emitting non-diffraction limited pumping beams are usually smaller and cheaper than lasers with a high beam quality. Therefore, the invention makes feasible solid-state lasers with remarkably smaller sizes and lower costs, but with the same performance as the known lasers.

More particularly, the invention describes a laser for emitting pulsed electromagnetic radiation, said laser comprising: an optical resonator; a solid-state laser gain medium placed inside said optical resonator, said laser gain medium having a defined stimulated emission cross section and a defined spontaneous fluorescence lifetime for a given optical wavelength; means for passive mode locking placed inside said optical resonator; and means for exciting said laser gain medium to emit electromagnetic radiation, said exciting means comprising a pumping source for emitting pumping radiation which impinges on said laser gain medium in the form of at least one non-diffraction-limited focused pumping beam with essentially one pumping wavelength, the product of said cross-section and said fluorescence lifetime being equal to or smaller than $0.15 \cdot 10^{-23}$ cm$^2$s.

The pumping-beam section inside said laser gain medium is preferably equal to or smaller than two times the confocal parameter of said focused pumping beam. The absorption length of said laser gain medium is preferably equal to or smaller than the pumping-beam section inside said laser gain medium at the pumping wavelength.

In an exemplary embodiment, the solid-state laser gain medium is Ti:Al$_2$O$_3$ with a Ti$_2$O$_3$ content higher than or equal to 0.25 percent in weight, i.e., an absorption length of 2.1 mm. The pumping source is a frequency-doubled Nd:vanadate laser. The non-diffraction-limited pumping beam has a coefficient of beam quality M$^2$ higher than 2 and a pumping power lower than 3 W. The means for mode locking is a semiconductor saturable absorber mirror. Such a mode locked Ti:Al$_2$O$_3$ laser according to the invention emits an average power higher than 50 mW and has pulse widths shorter than 250 fs.

The means for passive mode locking comprise for example a saturable absorber which preferably is a semiconductor saturable absorber mirror device.

The invention further describes a method for generating pulsed laser radiation, comprising the steps of: generating at least one non-diffraction-limited focused pumping beam with essentially one pumping wavelength; exciting a solid-state laser gain medium to emit electromagnetic radiation, by impinging said at least one pumping beam on said laser gain medium, said laser gain medium having a defined stimulated emission cross section and a defined spontaneous fluorescence lifetime for a given optical wavelength and the product of said cross-section and said fluorescence lifetime being equal to or smaller than $0.15 \cdot 10^{-23}$ cm$^2$s; recirculating said electromagnetic radiation in an optical resonator; and passively mode locking said electromagnetic radiation.

BRIEF DESCRIPTION OF THE DRAWINGS

FIG. 2 schematically shows mode matching in a solid-state laser medium according to the invention;

FIG. 3 schematically shows mode matching in a solid-state laser medium according to the state of the art;

FIG. 4 is a schematic top plan view of a preferred embodiment of a laser according to the invention;

DESCRIPTION OF THE PREFERRED EMBODIMENTS

Figure 1:
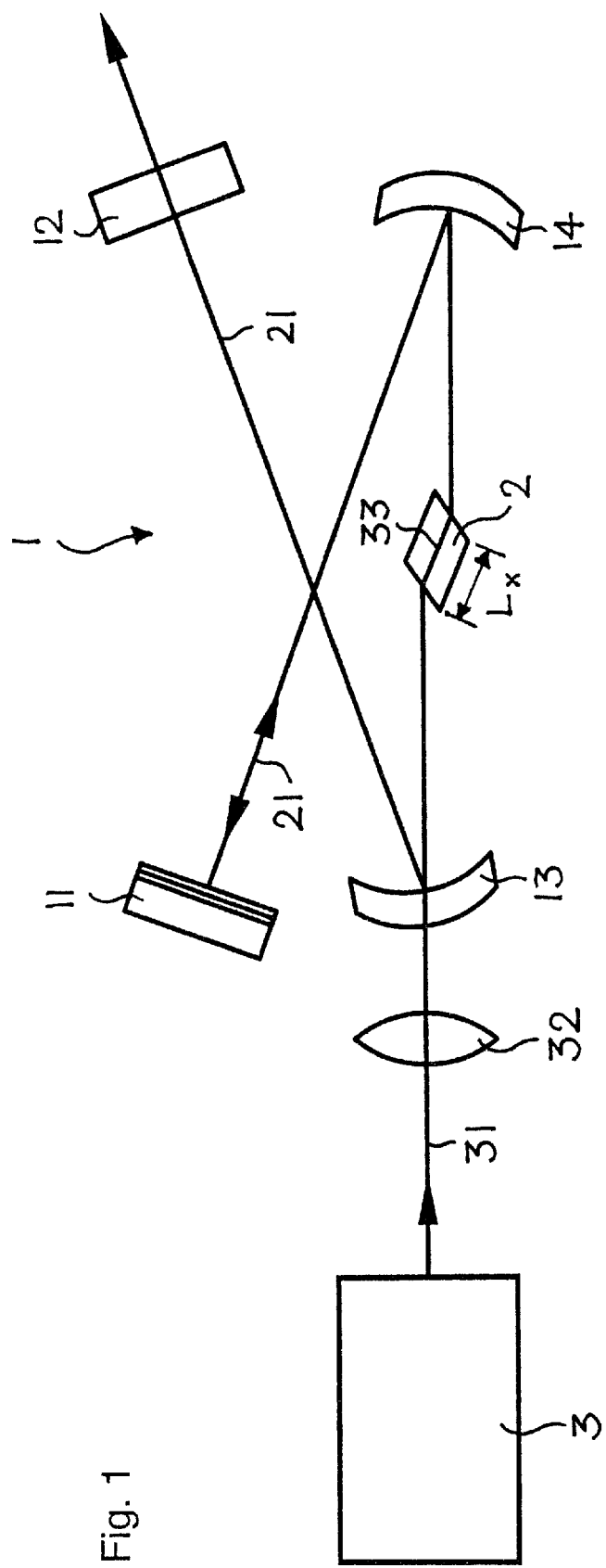
FIG. 1 is a schematic illustration of a laser according to the invention.

FIG. 1 shows a schematic, simplified illustration of a laser according to the invention. The laser comprises an optical resonator 1 delimited by a first reflective element 11 and a second reflective element 12. The first reflective element 11 may be, e.g., a dielectric mirror. The first reflective element 11 is preferably a semiconductor saturable absorber mirror device for mode locking the laser; it is described below with reference to FIG. 6. The second reflective element 12 may be, e.g., a partially reflecting outcoupling dielectric and/or metallic mirror.

A solid-state laser gain medium 2 is placed inside the optical resonator 1. This laser gain medium 2 can be a material containing transition-metal ions such as titanium sapphire (Ti:Al$_2$O$_3$), chromium yttrium aluminum garnet (Cr:YAG) or chromium forsterite (Cr:Fo), or alexandrite (Cr:BeAl$_2$O$_4$). These materials normally have relatively small gains and relatively large absorption lengths $L_a$ for visible and near-infrared wave-lengths. However, short absorption lengths La on the order of typically one or a few millimeters are required according to the invention. Such short absorption lengths $L_a$ can be achieved by using a highly doped laser gain medium 2. In a preferred embodiment, the laser gain medium is titanium sapphire with a Ti$_2$O$_3$ content higher than or equal to 0.25% in weight. The length $L_x$ of the laser gain medium 2 is chosen to be equal to or smaller than two times the confocal parameter b of the focused pumping beam 31. By fulfilling this condition, an optimum mode matching of the pumping mode 31 and the laser mode 21 in the laser gain medium 2 is achieved.

The laser according to the invention further comprises a pumping source 3 for exciting the laser gain medium 2 to emit electromagnetic radiation. The pumping source emits a non-diffraction-limited pumping beam 31 which is focused onto the laser gain medium 2 by a focusing means 32, e.g., a focusing lens, thus stimulating an emission of a laser beam 21 by the laser gain medium 2. The wavelength of the pumping radiation is preferably shorter than 650 nm. In a preferred embodiment, the pumping source 3 is a frequency-doubled neodymium vanadate (Nd:YVO$_4$) laser with a coefficient of beam quality $M^2>2$, e.g., $M^2=5$. It can also be, e.g., a frequency-doubled neodymium aluminum garnet (Nd:YAG) laser, a laser diode or an arrangement of a plurality of laser diodes. According to the invention, the absorption length $L_a$ of the laser gain medium 2 at the pumping wavelength is chosen to be equal to or smaller than the length $L_x$ of the laser gain medium 2, i.e., the pumping-beam section 33 inside the laser gain medium 2. This condition is important for an efficient laser.

The laser beam 21 is partially outcoupled from the resonator 1 by the partially reflecting mirror 11. Two focusing mirrors 13, 14 within the resonator 1 are used as folding mirrors for the laser beam 21.

FIGS. 2 and 3 compare mode matching according to the invention and according to the state of the art, respectively. They schematically show a laser beam 21, 21' and a pumping beam 31, 31' in a solid-state laser medium 2, 2'. According to the state of the art (FIG. 3), a high overlap of the resonator mode 21' and the pumping beam 31' over a large distance is required. This is especially important if the laser uses Kerr-lens mode locking to produce a self amplitude modulation. The pumping laser 3 must emit its fundamental TEM$_{00}$ mode and be diffraction-limited, i.e., have a coefficient of beam quality $M^2$~1; its typical confocal parameter b is several cm, depending on its waist diameter $2w_p$. In order to obtain a TEM$_{00}$ laser mode, the pumping-beam diameter $2w_p$ is chosen to be slightly smaller, e.g., by a factor of 0.8, than the laser-beam diameter $^2W_L$.

According to the invention (FIG. 2), the laser medium 2 is pumped by a non-diffraction limited pumping beam 31 with a coefficient of beam quality $M^2>2$; typical coefficients of beam quality are $M^2 \geq 5$. The typical pumping power is smaller than 3 W. To make this possible, the length $L_x$ of the laser medium 2 is chosen to be equal to or smaller than two times the confocal parameter of the pumping beam 31, and the absorption length $L_a$ of the laser gain medium 2 is chosen to be equal to or smaller than the length $L_x$ of the laser medium 2:

$$L_a \leq L_x \leq 2b,$$

for example, $$L_a = 2L_x = 4b.$$

(The length $L_x$ of the laser medium 2 is understood to be defined as the length of the section 33 of the pumping beam 31 inside the laser medium 2.) Preferably, a laser medium 2 with a short absorption length $L_a$ is used. A preferred laser medium 2 is a highly doped Ti:Al$_2$O$_3$ crystal. Table I gives the absorption lengths $L_a$ (in mm) for a Ti:Al$_2$O$_3$ crystal at a light wavelength of $\lambda=514$ nm as a function of the Ti$_2$O$_3$ content (in percent in weight).

TABLE I

| Wt % Ti$_2$O$_3$ | 0.03 | 0.03 | 0.10 | 0.15 | 0.25 |
|---|---|---|---|---|---|
| $L_a$ (mm) | 13.3 | 8.0 | 5.0 | 3.6 | 2.1 |

Typical values of lasers according to the invention are: $L_a$~2.1 mm, $L_x$~4 mm, and b~8 mm (according to the last column of Table I) for a pumping-beam diameter of $2w_p$~90 µm and $M^2$~5. For optical wavelengths $\lambda$ around 800 nm, Ti:Al$_2$O$_3$ has typically a stimulated emission cross section of $\sigma$~4·10$^{-19}$ cm$^2$ and a spontaneous fluorescence lifetime of $\tau$~2.5 µs, which yields a product of $\sigma\tau$~0.1·10$^{-23}$ cm$^2$s. This product is low compared to other known laser-gain materials such as Cr:LiSAF ($\sigma\tau$~0.23·10$^{-23}$ cm$^2$s), ruby ($\sigma\tau$~7.5·10$^{-23}$ cm$^2$s) or Nd:YAG ($\sigma\tau$~16·10$^{-23}$ cm$^2$s). Nevertheless, the invention makes possible a mode locked Ti:Al$_2$O$_3$ laser with a high output power pumped by a non-diffraction limited pumping beam.

It should be noted that especially known pulsed lasers do not work in a satisfactory manner with non-diffraction limited pumping beams, i.e., with $M^2>1$. The diffraction-limited pumping beam of FIG. 3 can be kept focused over a long distance; however, this is not possible with the bad-quality pumping beam of FIG. 2 because of its large divergence angle. Normally, in order to obtain good mode matching with $M^2>1$, the pumping-beam waist has to be increased accordingly, and also the laser-mode waist has to be increased. Consequently, the small-signal gain decreases and the pump threshold increases. Further, the intracavity intensity decreases. This means that the nonlinear Kerr effect is strongly reduced, which makes Kerr-lens mode locking more and more difficult. Nonlinear aperturing in the laser medium also decreases due to the larger laser-mode waist, further weakening the Kerr-lens mode locking action.

Figure 5:
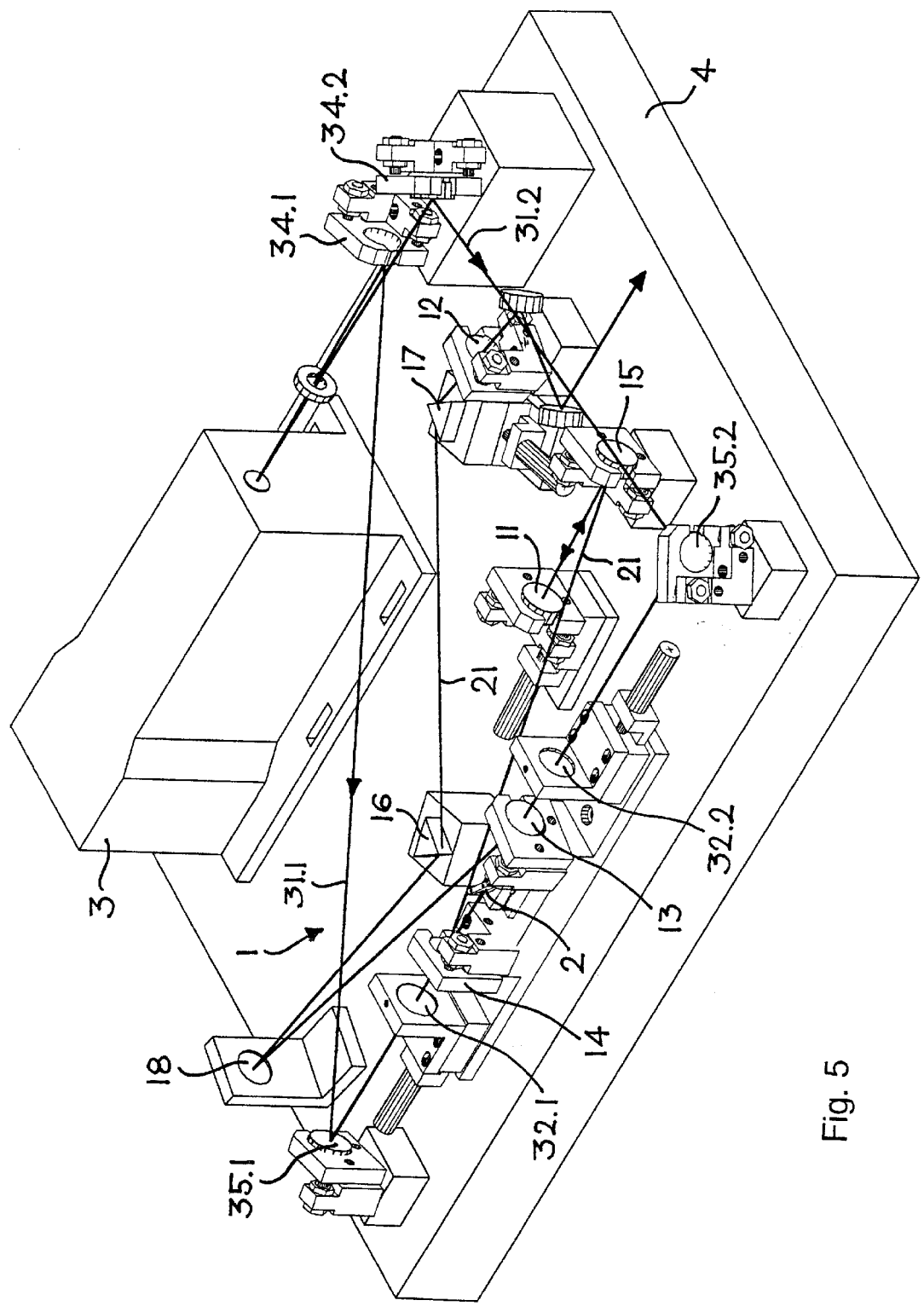
FIG. 5 is a perspective view of the preferred embodiment of the laser of FIG. 4.

In the preferred embodiment of the invention according to FIGS. 4 and 5, the laser medium 2 is a Ti:Al$_2$O$_3$ crystal with a length of $L_x=4$ mm and a Ti$_2$O$_3$ content of 0.25% in weight (cf. last column of Table I). The optical resonator 1 is delimited by a semi-conductor saturable absorber mirror device 11 and a partially reflecting outcoupling mirror 12. A focusing mirror 15 inside the resonator 1 is used to focus the laser beam 21 onto the semiconductor saturable absorber mirror 11. Two other focusing mirrors 13, 14 and a planar mirror Inside the resonator 1 are used as folding mirrors. A dispersion-compensating prism pair 16, 17 is incorporated and provides negative second-order dispersion.

The pumping source 3 is a frequency-doubled neodymium vanadate (Nd:YVO$_4$) laser with a coefficient of beam quality $M^2>2$, e.g., $M^2=5$, and a pumping power lower than 3 W. It emits two spatially separated pumping beams 31.1, 31.2 which are directed onto the Ti:sapphire crystal 2 from two opposite sides by mirrors 34.1, 35.1 and 34.2, 35.2, respectively. Focusing lenses 32.1, 32.2 focus the pumping beams 31.1, 31.2 into the Ti-sapphire crystal. The pumping-beam waists $2w_p$ may coincide, e.g., in the middle of the Ti:sapphire crystal 2 (cf. FIG. 2), or may be spatially separated. The elements are mounted onto a base 4.

Figure 6:
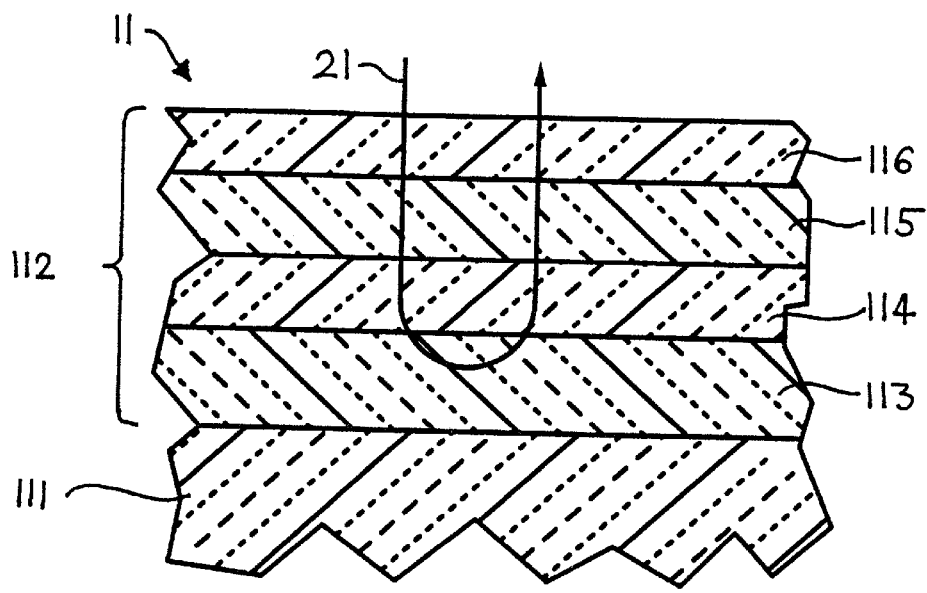
FIG. 6 is a schematic cross-section through a semiconductor saturable absorber mirror used in a preferred embodiment of the laser according to the invention.

FIG. 6 shows a schematic cross-section through a semiconductor saturable absorber mirror 11 used in a preferred embodiment of the pulsed laser according to the invention. A laser beam which is reflected by the semiconductor saturable absorber mirror 11 is sketched as an arrow 21. The semiconductor saturable absorber mirror 11 consists of a bottom mirror 111 and a saturable absorber structure 112. The bottom mirror 111 is typically a Bragg mirror, i.e., a stack of semiconductor and/or dielectric quarter-wave layers on a (not shown) substrate, wherein high-refractive-index layers and low-refractive-index layers alternate with each other. The quarter-wave layers of the bottom mirror 111 consist of, e.g., GaAs (n=3.65 at $\lambda$=835 nm) and AlAs (n=2.99 at $\lambda$=835 nm). The saturable absorber structure 112 of FIG. 6 is a first AlAs structure 113 with a thickness of 75 nm, a GaAs absorber layer 114 with a thickness of 15 nm, an AlAs spacer layer 115 with a thickness of 15 nm, and a GaAs cap 116 with a thickness of 5 nm. This semiconductor saturable absorber mirror 11 yields a reflectivity of R=0.990 for a low-power beam (continuous-wave mode) and R=0.995 for a high-power beam (pulsed mode). Of course, a person skilled in the art is able to design other semiconductor saturable absorber mirrors 11.

Figure 7:
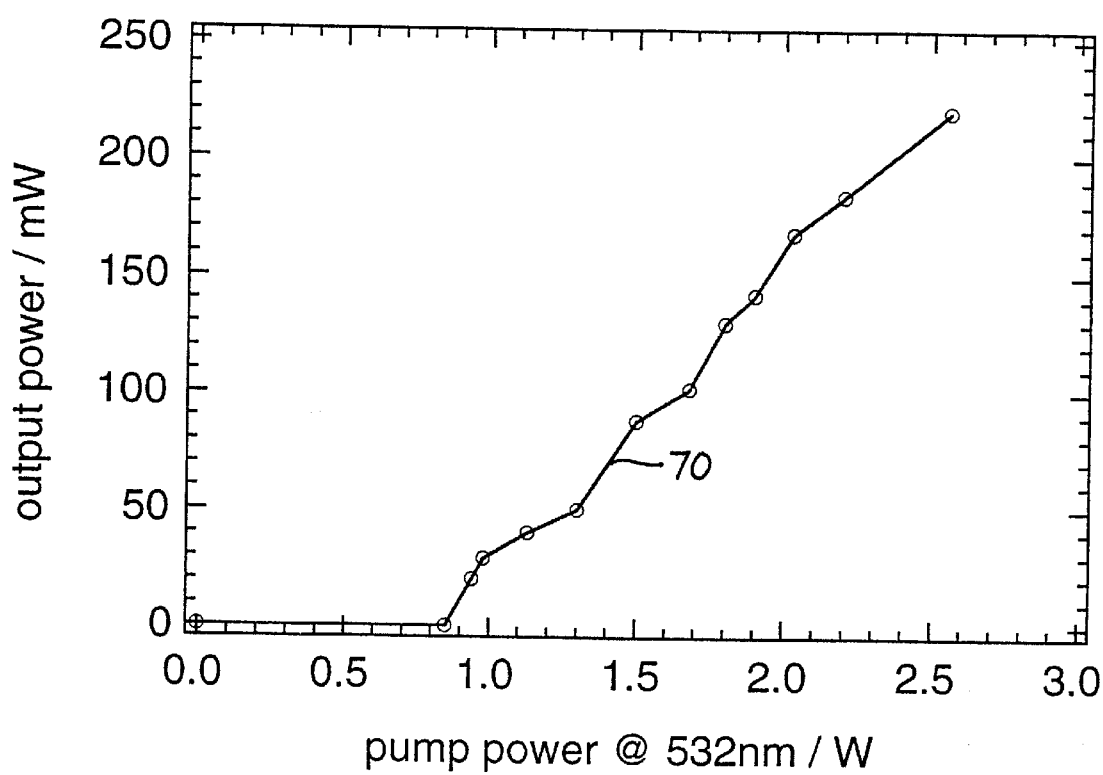
FIG. 7 is a graphical representation of the optical output power vs. the optical pumping power for a Ti:Al$_2$O$_3$ laser according to the invention.
Figure 8:
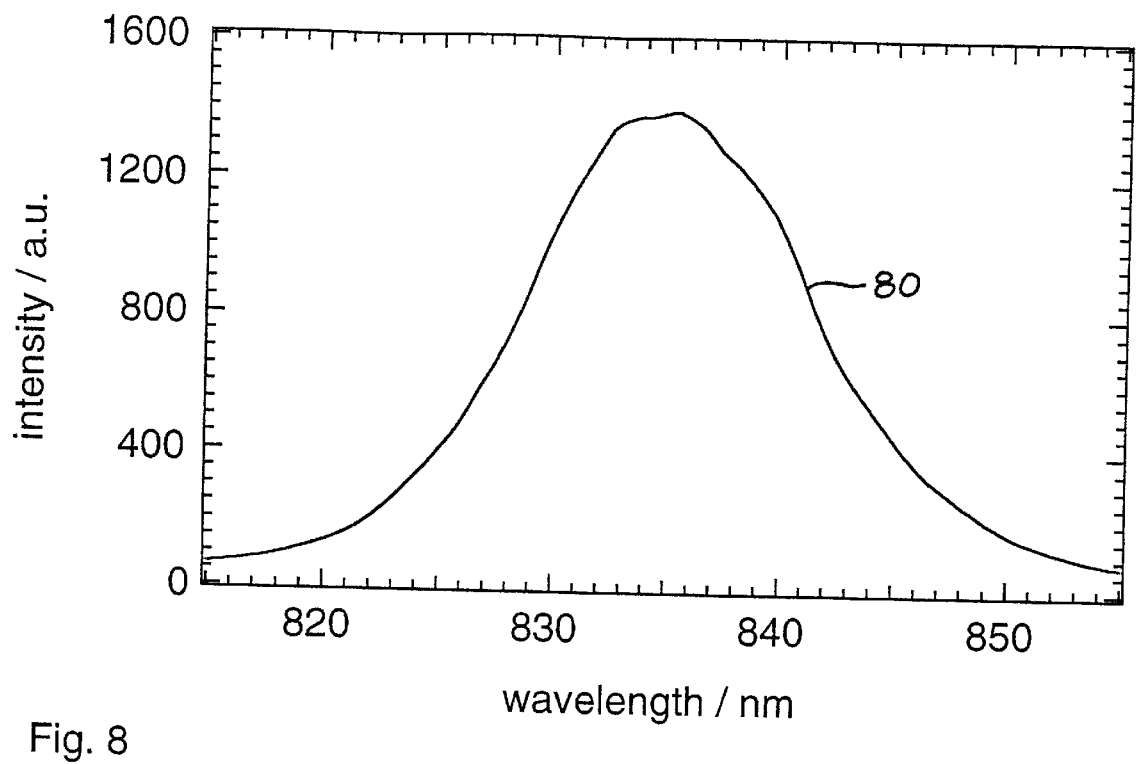
FIG. 8 is a graphical representation of the optical spectrum of a Ti:Al$_2$O$_3$ laser according to the invention.
Figure 9:
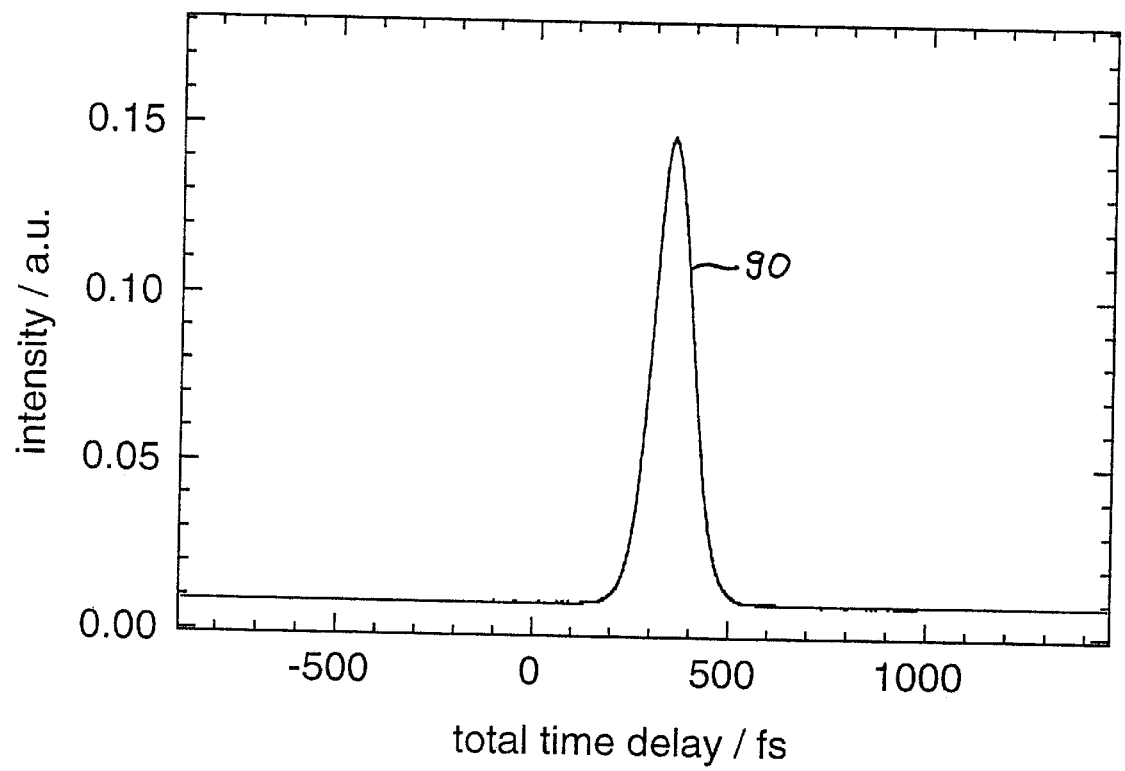
FIG. 9 is a graphical representation of the autocorrelation function of the spectrum of FIG. 8.

Some experimental characteristics of the laser of FIGS. 4 and 5 with a semiconductor saturable absorber mirror 11 as in FIG. 6 are presented in FIGS. 7–9. A typical curve 70 showing the optical output power vs. the optical pumping power is shown in FIG. 7. For a pumping power of 2 W at 532 nm, an output power of 170 mW is obtained. The optical spectrum 80 of the laser of FIGS. 4 and 5, shown in FIG. 8, indicates that the average output wavelength is 835 nm. From the autocorrelation function 90 of the spectrum 80, the pulse width can be determined; the pulse width is the full width at half maximum times a correction factor which depends on the form of the curve form. For the curve 90 of FIG. 9, the correction factor is 0.645, and we obtain a pulse width of 75 fs.

What is claimed is:

1. A laser for emitting pulsed electromagnetic radiation, said laser comprising:

an optical resonator;

a solid-state laser gain medium placed inside said optical resonator, said laser gain medium having a defined stimulated emission cross section and a defined spontaneous fluorescence lifetime for a given optical wavelength;

means for passive mode locking placed inside said optical resonator; and means for exciting said laser gain medium to emit electromagnetic radiation, said exciting means comprising a pumping source for emitting pumping radiation which impinges on said laser gain medium in the form of at least one non-diffraction-limited focused pumping beam with essentially one pumping wavelength;

the product of said cross-section and said fluorescence lifetime being equal to or smaller than $0.15 \cdot 10^{-23}$ cm$^2$s.

2. The laser according to claim 1 wherein the pumping-beam section inside said laser gain medium is equal to or smaller than two times the confocal parameter of said focused pumping beam.

3. The laser according to claim 1 wherein said laser gain medium has a defined absorption length for a given optical wavelength, and said absorption length is equal to or smaller than the pumping-beam section inside said laser gain medium at the pumping wavelength.

4. The laser of claim 1 wherein said solid-state laser gain medium contains transition-metal ions.

5. The laser of claim 4 wherein said solid-state laser gain medium is selected from the group consisting of Ti:Al$_2$O$_3$, Cr:YAG, Cr:Fo and Cr:BeAl$_2$O$_4$.

6. The laser of claim 5 wherein said solid-state laser gain medium is Ti:Al$_2$O$_3$ with a Ti$_2$O$_3$ content higher than or equal to 0.25 percent in weight.

7. The laser of claim 1 wherein said pumping wavelength is shorter than 650 nm.

8. The laser of claim 7 wherein said pumping source is a frequency-doubled Nd:YVO$_4$ laser, a frequency-doubled ND:YAG laser or at least one laser diode.

9. The laser of claim 1 wherein the pumping beam has a coefficient of beam quality M$^2$ equal to or higher than 2.

10. The laser of claim 1 wherein the electromagnetic radiation emitted by said pumping source is directed into said laser gain medium in the form of two pumping beams from essentially opposite directions.

11. The laser of claim 1 wherein said means for mode locking comprise a saturable absorber.

12. The laser of claim 11 wherein said saturable absorber is a semiconductor saturable absorber mirror device.

13. A method for generating pulsed laser radiation, comprising the steps of:

generating at least one non-diffraction-limited focused pumping beam with essentially one pumping wavelength;

exciting a solid-state laser gain medium to emit electromagnetic radiation, by impinging said at least one pumping beam on said laser gain medium, said laser gain medium having a defined stimulated emission cross section and a defined spontaneous fluorescence lifetime for a given optical wavelength and the product of said cross-section and said fluorescence lifetime being equal to or smaller than $0.15 \cdot 10^{-23}$ cm$^2$s;

recirculating said electromagnetic radiation in an optical resonator; and passively mode locking said electromagnetic radiation.

14. The method of claim 13 wherein said pumping-beam section inside said laser gain medium is equal to or smaller than two times the confocal parameter of said focused pumping beam.

15. The method of claim 13 wherein said laser gain medium has a defined absorption length for a given optical wavelength, and said absorption length is equal to or smaller than the pumping-beam section inside said laser gain medium at the pumping wavelength.

* * * * *